United States Patent [19]

Witte

[11] 4,234,609

[45] Nov. 18, 1980

[54] METHOD OF FORMING FOOD PRODUCT FROM MOLLUSKS AND PRODUCT THEREOF

[75] Inventor: Philip A. Witte, West Alton, Mo.

[73] Assignee: Ralston Purina Company, St. Louis, Mo.

[21] Appl. No.: 937,618

[22] Filed: Aug. 28, 1978

Related U.S. Application Data

[63] Continuation-in-part of Ser. No. 840,925, Oct. 11, 1977, abandoned.

[51] Int. Cl.³ .............................................. A23L 1/333
[52] U.S. Cl. ................................... 426/104; 426/574; 426/643; 426/656; 426/802
[58] Field of Search ............... 426/104, 272, 574, 643, 426/646, 656, 802

[56] References Cited

U.S. PATENT DOCUMENTS

| | | | |
|---|---|---|---|
| 3,900,576 | 8/1975 | Schulz | 426/656 X |
| 3,904,776 | 9/1975 | Magnino, Jr. et al. | 426/656 X |
| 3,917,860 | 11/1975 | Ayres et al. | 426/656 X |
| 3,928,652 | 12/1975 | Lanter | 426/656 X |
| 3,968,269 | 7/1976 | Payne et al. | 426/643 X |
| 4,017,646 | 4/1977 | Hoer et al. | 426/802 X |

OTHER PUBLICATIONS

Komarik, S. L. et al., "Food Products Formulary", vol. 1, The Avi Publ. Co., Inc., Westport Conn., 1974, pp. 315, 316, 324.

*Primary Examiner*—Robert A. Yoncoskie
*Attorney, Agent, or Firm*—W. Dennis Drehkoff

[57] ABSTRACT

Meat from mollusks, especially clam and oyster meat, and isolated soy protein fibers are integrally bound by parboiling the meat, buffering the fibers, and mixing the two under agitation followed by forming and cooking.

17 Claims, No Drawings

_4,234,609_

METHOD OF FORMING FOOD PRODUCT FROM MOLLUSKS AND PRODUCT THEREOF

BACKGROUND OF THE DISCLOSURE

This application is a continuation-in-part application of U.S. Ser. No. 840,925, filed Oct. 11, 1977, now abandoned.

This invention generally relates to imitation meat products and a method of forming the same. More specifically, this invention relates to an imitation mollusk meat product, such as imitation clam meat, and a method of modifying the meat which is ordinarily incompatible with vegetable protein fibers.

Those interested in using a wide variety of protein sources to produce food products which resemble meat have for a number of years experimented with vegetable protein fibers. There have been a variety of techniques disclosed for manufacturing these fibers and many methods of use have been contemplated. Among the disclosures are U.S. Pat. Nos. 3,662,671; 3,662,672; 3,821,453; 28,091; U.S. Pat. Nos. 3,928,641 and 4,017,646. Previously, vegetable protein fibers were found to be totally incompatible with mollusk meat such as clam meat. If, for example, clam meat is cut up and vegetable protein fibers are added thereto, the meat cannot be reformed even upon stuffing into containers, compressing and heating because the mixture remains dissociated and fails to bind together or cohere into a continuous protein matrix. Although pH adjustment is known to affect the vegetable protein fibers' compatibility with meat, such adjustment of the pH of the fibers does not by itself provide a coherent product. Another unsuccessful attempt to bind the mollusk meat and fibers included addition of a gel forming soy protein isolate. Accordingly, an intact mollusk meat product which contains substantial amounts of vegetable protein fiber has heretofore been unattainable from known methods or from methods which would be obvious from the prior art.

SUMMARY OF THE INVENTION

The present invention provides for an intact imitation mollusk meat product containing substantial amounts of vegetable protein fiber and a method for forming the same. Generally, this may be accomplished by first parboiling the meat for a very short period of time and then mixing the parboiled meat with vegetable protein fibers buffered to a neutral pH followed by forming or molding the mixture and cooking same. This combination of steps provides a cohesive continuous protein matrix between the meat fibers and the vegetable protein fibers, integrally bound so as not to dissociate. Mollusk meat fibers, like other meat fibers, if partially cooked will heat-set to the point that they will not bind to themselves. They will, surprisingly, bind with the buffered vegetable protein fibers. It is believed there are active enzymes in or on mollusk meat which for some reason interfere with the hybrid matrix which would be formed between the meat fibers and the vegetable protein fibers. Apparently, the parboiling deactivates these enzymes and the buffered vegetable protein fibers serve functionally to replace the mollusk meat protein while structurally serving to bridge gaps in the mollusk protein matrix so as to texture the product.

DESCRIPTION OF THE PREFERRRED EMBODIMENTS

In accordance with the present invention, buffered vegetable protein fibers are admixed with parboiled mollusk meat formed and cooked, preferably under pressure.

The vegetable protein fibers of the present invention are generally prepared by heating a slurry of proteinaceous material by passing it through a heat exchanger at a proteinaceous solids level of between about 0.5 and 35% by weight, under pressure, and heating said slurry for a sufficient period of time to separate elongated monofilaments, herein referred to as fibers, from the slurry. The filaments are continuously removed from the heat exchanger zone through a back pressure creating orifice and discharged into a collecting zone. In the process of this invention, the fibers are buffered, for example, with any convenient buffering solution which does not destroy the functionality of the protein. Examples of such are aqueous solutions of sodium phosphates, sodium bicarbonate, or preferably sodium carbonate. Sodium carbonate is preferred because it is very effective in small concentrations and the reaction is gentle. Buffering in the present invention means bringing the pH of the fibers to a neutral range of about 5.8 to 7.1, preferably 6.8 to 7.1.

The mollusk meat of the present invention may be taken from any animal from the phylum mollusca which includes most invertebrate animals popularly called shellfish, except crustaceans. It includes snails, mussels and other bivalves, especially clams and oysters, which have a soft unsegmented body lacking segmented appendages and commonly protected by a calcareous shell. Although this invention is directed to all members of the phylum mollusca, it is particularly directed to clams and oysters due to their widespread commercial exploitation.

The mollusk meat may be parboiled by dipping it in, for example, very hot to boiling water, steam or a combination thereof for just enough time to begin to cook the meat but not enough to fully cook it. For example, the temperature of the medium may range from 180° F. to about 250° F. The exposure time could range from ten or fifteen seconds to two minutes and possibly up to ten minutes or longer if the meat is frozen. It is believed that even these conditions may vary provided, however, that the enzymes are inactivated. Any known means to deactivate the enzymes present in the meat may be utilized however, just so the flavor and texture of the meat is not impaired. Without any intention to limit the invention, parboiling or blanching is preferred.

The mollusk meat is cut or chopped up into any convenient size which would permit the meat to be reformed in combination with the above-described buffered fibers.

The buffered fibers and the parboiled or enzyme deactivated mollusk meat are mixed under agitation as, for example, in a tumbling drum, a meat massager, a silent cutter or a mixer. The mixing continues until the chunks of meat and the buffered fibers begin to mold into larger blocks of meat and fiber so as to form the meat and fiber matrix. The blocks of reformed meat fiber are then formed into any convenient shape, as for example, in a loaf pan and are then cooked, preferably under pressure, as for example, water-cooked in a loaf pan with a pressure lid applied. The product is cooked until the hybrid proteinaceous matrix is set throughout the product and no visible sign of differentiation between the mollusk meat fibers and the vegetable protein fibers can be observed. Typically, this will involve cooking to an internal temperature ranging between 150° F. to about 220° F.

The protein-fortified product of this invention may contain a substantial amount of vegetable protein fibers ranging up to about 80% by weight with, of course, the mollusk meat providing at least about 20% of the product by weight. Only minor amounts of flavoring are necessary for example, as little as 1%. Additionally, other vegetable protein source material such as powdered isolate or concentrates can also be added to the meat and vegetable protein fiber mixture to replace varying amounts of either vegetable protein fiber or meat. For example, one typical embodiment of this invention could include from 0 to 10% soy protein isolate in powdered form while having an amount of mollusk meat ranging between 10 and 60% and an amount of fiber, vegetable protein isolate, ranging from 5 to 80%, all percentages by weight. The product has the mouthfeel, flavor and texture of mollusk meat in a coherent protein matrix that does not dissociate.

The following examples are intended to illustrate the invention:

EXAMPLE I

The clam meat is prepared by adding 16 parts of quahog clam meat and 17.1 parts of surf clam meat together and dipping them in 190° F. water for ninety seconds, withdrawing the clam meat and then chilling in cold water. The meat is then added to a silent cutter where cutting is maintained for fifteen minutes.

Soy protein fibers, which are commercially available under the tradename SPF-200 from the Ralston Purina Company, St. Louis, Missouri, are obtained and 65.9 parts of such fibers are mixed for twenty minutes in an aqueous solution of sodium carbonate until pH 7 is obtained. The amount of sodium carbonate present is 1% of the weight of the fibers and the amount of water present is 10% of the weight of the fibers.

The clam meat and the fibers are mixed together with 1 part of flavoring for five minutes in a bowl mixer which was adequate time to permit the meat and fibers to begin to adhere into a single matrix. The meat-fiber mixture is then stuffed into a polyethylene-lined loaf pan and a pressure lid is applied. The product is water-cooked to an internal temperature of 180° F.

The product exhibits an excellent homogeneous cross section, with meat fibers and soy isolate fibers being intertwined into a single matrix. The product has good texture and mouth feel.

EXAMPLE II

This example shows the preparation of oyster patties utilizing oyster pieces.

Frozen oyster pieces in an amount equal to about 42 parts by weight of the final product are placed in boiling water at a temperature of about 212° F. for ten minutes. The nectar from the oyster pieces is saved for flavoring. The meat is then withdrawn from the water, chilled and then added to a silent cutter and cut for fifteen minutes.

Soy protein fibers are tenderized by mixing 29 parts by weight of the fibers in a solution of about 0.2 parts sodium carbonate and 3 parts oyster nectar in a bowl mixer for five minutes until a pH of 7 is obtained.

Five parts of a soy isolate powder sold under the trademark Supro ® 620, by the Ralston Purina Company, are mixed with twenty parts oyster nectar in a silent cutter where they are chopped until smooth.

The oyster meat, soy fibers and isolate, and about 0.2% parts by weight oyster flavoring and 0.2% parts by weight monosodium glutamate are mixed for five minutes in a bowl mixer to permit the meat and fibers to begin to adhere. The meat-fiber mixture is then stuffed into casings and cooked in water to an internal temperature of 180° F. The product then may be dipped into a batter, breaded and frozen. Upon heating and serving, the product exhibited good flavor, texture and mouthfeel.

The foregoing examples are merely illustrative of the instant invention and it will be understood that various other changes in the details, materials or steps which have been described may be made without departing from the spirit of the instant disclosure, and such changes or other modifications are intended to be included within the scope of the instant disclosure and appended claims.

What is claimed is:

1. A method of making an imitation mollusk meat product containing at least binding amounts of isolated vegetable protein fibers comprising:
   admixing the fibers buffered to about neutral pH, and at least about 20% by weight parboiled mollusk meat, forming said mixture; and cooking said formed mixture to an internal temperature effective to form a coherent protein matrix.

2. The method of claim 1 wherein said parboiling is performed in a heating medium having a temperature ranging from about 180° F. to about 250° F.

3. The method of claim 1 wherein the mollusk meat is selected from the group consisting of clams and oysters.

4. The method of claim 1 wherein the fibers have a pH ranging from about 5.8 to about 7.1.

5. The method of claim 1 wherein the fibers are isolated soy protein fibers.

6. The method of claim 1 wherein the amount of vegetable protein fibers is up to 80% by weight.

7. The method of claim 6 wherein the amount of fibers is from 5–80% by weight.

8. The method of claim 1 wherein there is included in said admixture from about 0 to 10% by weight soy protein isolate in powdered form.

9. A method of making an imitation mollusk meat product containing at least binding amounts of isolated soy protein fibers comprising:
   a. providing at least about 20% by weight mollusk meat parboiled at from about 180° F. to about 250° F.;
   b. mixing said mollusk meat with said fibers buffered at from about pH 5.8 to about pH 7.1;
   c. forming said mixture, and cooking said formed mixture to an internal temperature of between 150° F. and 220° F.

10. The method of claim 9 wherein the mollusk meat is selected from the group consisting of clams and oysters.

11. A method of making an imitation mollusk meat product comprising:
   a. parboiling mollusk meat;
   b. mixing said parboiled meat with from 5 to 80% by weight isolated soy protein fibers buffered to about neutral pH;
   c. forming said mixture; and cooking said formed mixture to an internal temperature of between about 150° F. and 220° F.

12. The method of claim 11 wherein the meat is selected from the group consisting of clams and oysters.

13. An imitation mollusk meat product prepared by the process of claim 1.

14. The product of claim 13 wherein the amount of isolated vegetable protein fiber is up to 80% by weight.

15. The product of claim 13 wherein the mollusk meat is selected from the group consisting of clams and oysters.

16. The product of claim 13 wherein the isolated vegetable protein fibers are at a pH of about 5.8 to 7.1.

17. The method of claim 1 wherein said internal temperature is from about 150° F. to 220° F.

* * * * *